(12) United States Patent
Matsuda

(10) Patent No.: US 7,574,128 B2
(45) Date of Patent: Aug. 11, 2009

(54) PHOTOGRAPHING APPARATUS AND PHOTOGRAPHING METHOD

(75) Inventor: Norihisa Matsuda, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 260 days.

(21) Appl. No.: 11/802,361

(22) Filed: May 22, 2007

(65) Prior Publication Data

US 2007/0274703 A1    Nov. 29, 2007

(30) Foreign Application Priority Data

May 23, 2006    (JP)    ............................... 2006-142825

(51) Int. Cl.
- G03B 17/00    (2006.01)
- G03B 17/18    (2006.01)
- G03B 9/64     (2006.01)
- G06K 9/00     (2006.01)

(52) U.S. Cl. ...................... 396/264; 396/286; 396/472; 382/118

(58) Field of Classification Search ................ 396/264, 396/265, 286, 316, 472; 382/118; 348/221.1, 348/231.99, 239, 345, 348

See application file for complete search history.

(56) References Cited

U.S. PATENT DOCUMENTS

| | | | |
|---|---|---|---|
| 7,298,412 B2 * | 11/2007 | Sannoh et al. | 348/348 |
| 2003/0071908 A1 * | 4/2003 | Sannoh et al. | 348/345 |
| 2007/0019083 A1 * | 1/2007 | Nakashima | 348/239 |
| 2008/0122943 A1 * | 5/2008 | Itoh | 348/222.1 |
| 2008/0273097 A1 * | 11/2008 | Nagashima | 348/231.99 |
| 2009/0079844 A1 * | 3/2009 | Suzuki | 348/222.1 |

FOREIGN PATENT DOCUMENTS

JP    2005-277907    10/2005

* cited by examiner

*Primary Examiner*—Melissa J Koval

(74) *Attorney, Agent, or Firm*—McGinn IP Law Group, PLLC

(57) ABSTRACT

According to the present invention, a self photographing is effected upon a detection of a face, which prevents a photographing of a failed image which does not include a face of a person in intending photographing a person. In particular, in generating a self portrait photograph where the photographer himself/herself is the object, even through the photographer is away from the photographing apparatus operation, a clocking and a shutter control are performed to obtain an image having the photographer in a proper position only when the photographer properly enters in its field angle. The proper entrance of an object in a field angle facilitates an automatic exposure control and automatic focusing control.

17 Claims, 13 Drawing Sheets

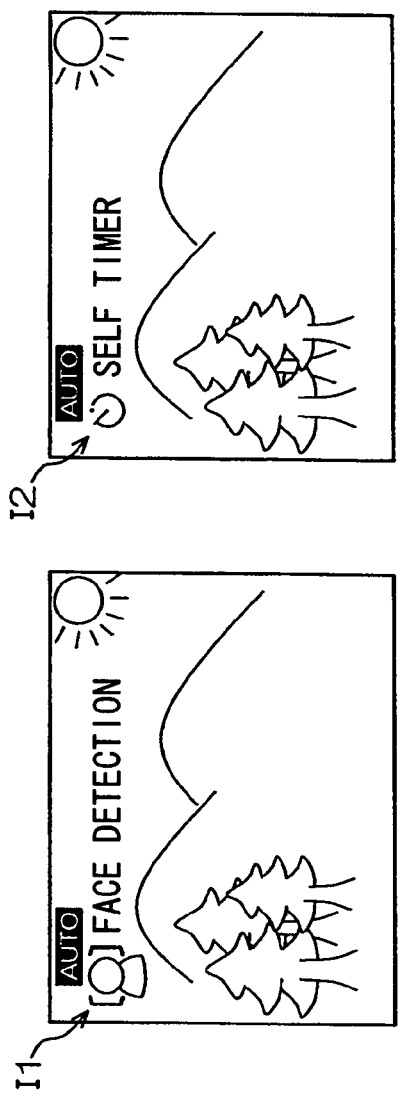
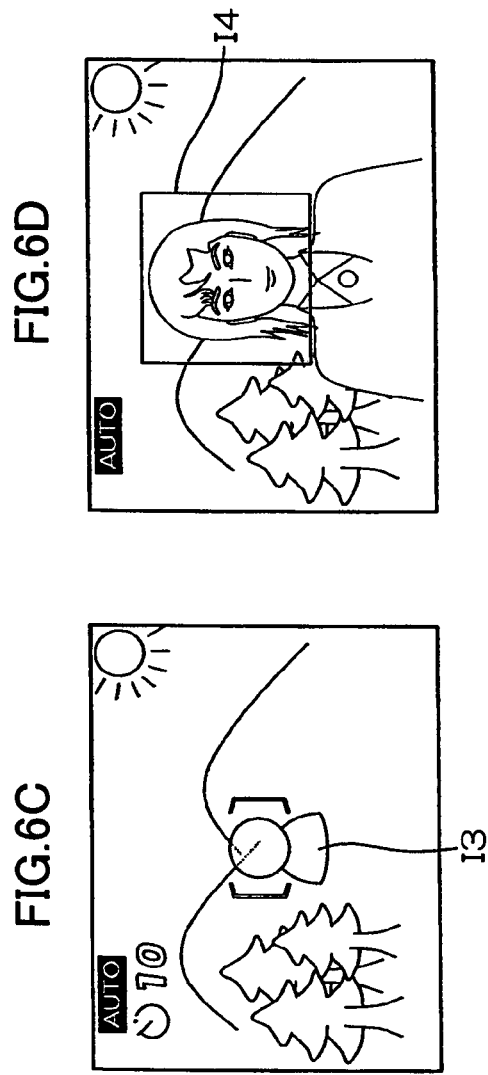
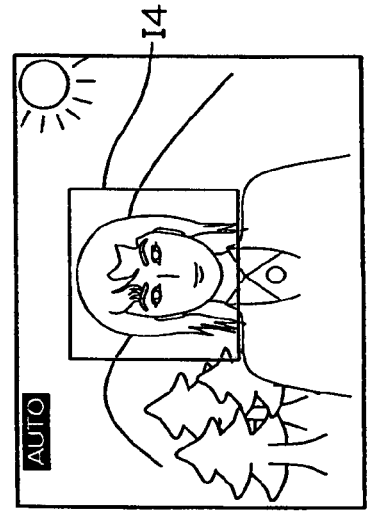
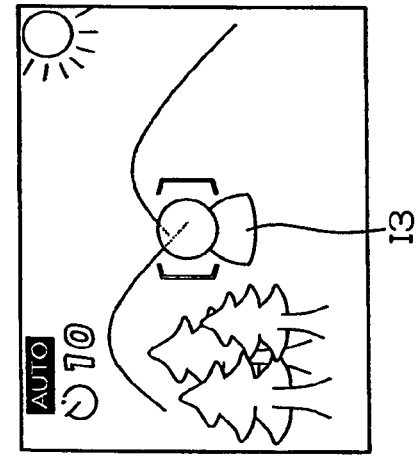

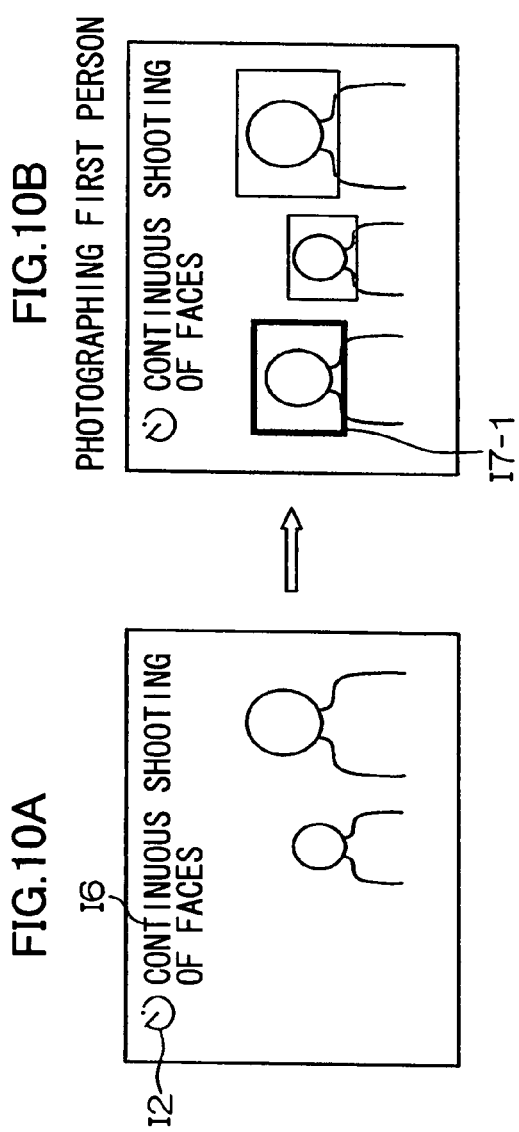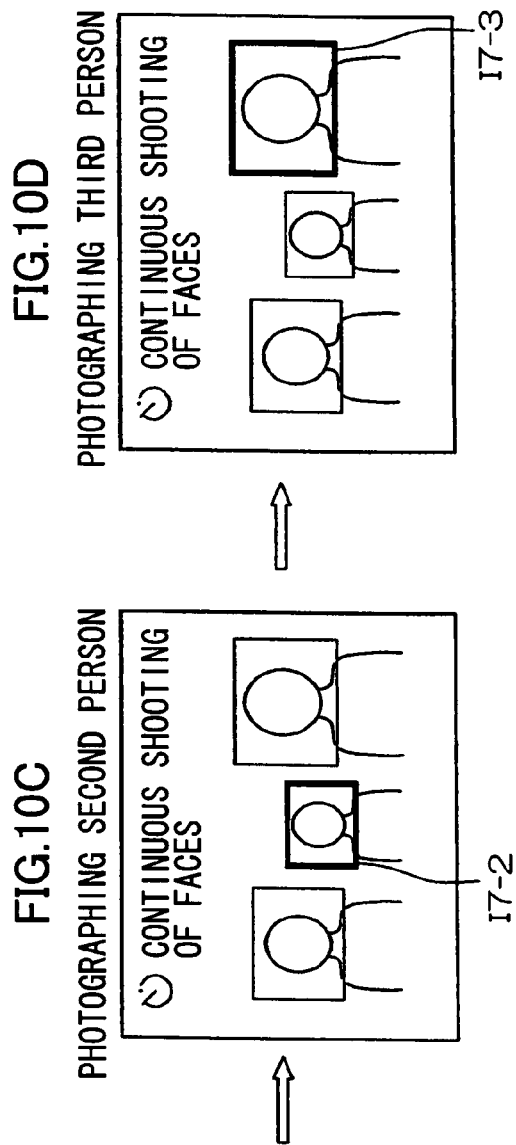

NONE FITTED

TWO PERSONS FITTED

ONE PERSON FITTED

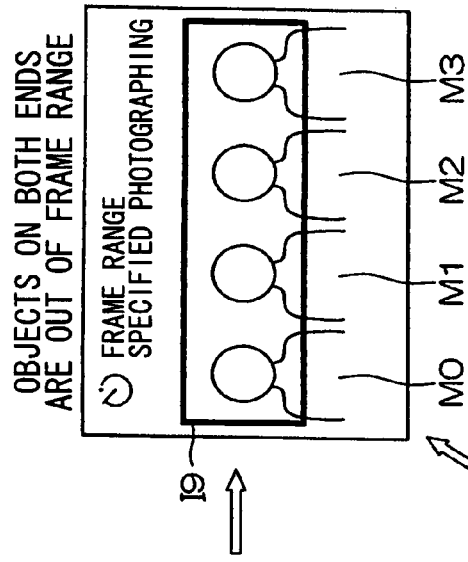
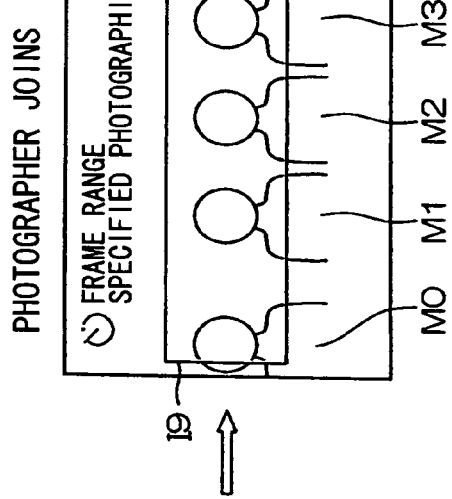
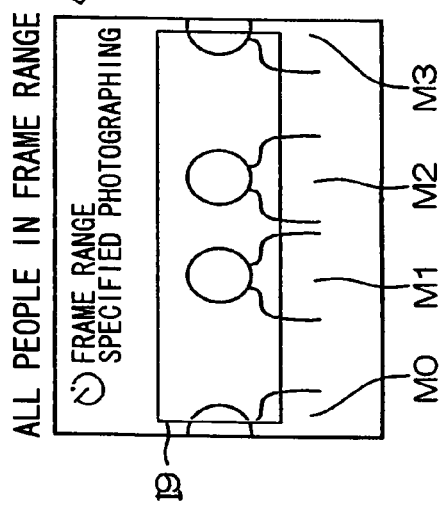
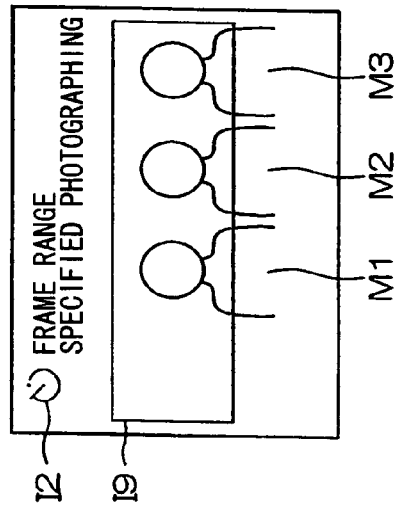

PHOTOGRAPHING APPARATUS AND PHOTOGRAPHING METHOD

BACKGROUND OF THE INVENTION

1. Field of the Invention

The present invention relates to a photographing apparatus having a self-timer photographing function.

2. Description of the Related Art

Japanese Patent Application Laid-Open No. 2005-277907 discloses a camera which has a function for photographing an image of an object by recognizing skin color information of the object and detecting the entrance of the object (that is, a person) to a frame to start a counting down operation by a self-timer for photographing.

However, the technology disclosed in Japanese Patent Application Laid-Open No. 2005-277907 determines the entrance of an object based on color information, thereby a similar color leads to an error detection, and if a person other than an object is inside the frame before the object person to be photographed enters there, the person will be detected as an object in the frame. That is, the technology is only useful in a scene with a skin color of a person to be detected against a background which includes no skin color component.

SUMMARY OF THE INVENTION

The present invention was made in view of the above problems, and one object of the present invention is to provide a photographing apparatus which starts a self photographing once a desired condition is met, for a so-called self portrait which is the type a photographer photographs himself/herself by using a self-timer, and a group portrait, and provides a satisfying successful image.

The present invention relates to a photographing apparatus, comprising: an image pickup element for receiving a light entered through a photographing lens from an object and continuously converting the light into an image signal, and outputting the image signal; an image data converting section for converting the image signal output from the image pickup element to an image data, and outputting the image data; a record indicating section for inputting a record indication of the image data; a self photographing setting section for setting a self photographing mode; a self-timer circuit for clocking a predetermined time of period in response to a receipt of an input of the record indication at the record indicating section in the state in which the self photographing mode is set by the self photographing setting section; a shutter control section for controlling exposure of the image pickup element in response to completion of the clocking of the predetermined time of period by the self-timer circuit; a recording section for recording the image data of the image signal output from the image pickup element in response to the exposure controlled by the shutter control section; and a display section for displaying at least the image data recorded in the recording section.

The photographing apparatus further comprises: a face detecting section for detecting a face area of an object based on the image data output from the image data converting section, in response to a receipt of an input of the record indication at the record indicating section; and a photographing control section for controlling the self-timer circuit to clock the predetermined time of period when the face detecting section detects at least one face area.

According to the present invention, when at least one face area is detected, a clocking is performed by a self-timer circuit for a predetermined time of period, and in response to the completion of the clocking for the predetermined time of period, the image pickup element performs a shutter operation, so that an image data corresponding to the image signal output from the image pickup element is recorded in the recording section.

That is, a self photographing is effected upon a detection of a face, which prevents a photographing of a failed image which does not include a face of a person in intending photographing a person. In particular, in generating a self portrait photograph where the photographer himself/herself is the object, after the photographer is away from the photographing apparatus operation, a clocking and a shutter control are performed to be able to obtain an image having the photographer in a proper position only when the photographer properly enters in the field angle. The proper entrance of an object in a field angle facilitates an automatic exposure control and automatic focusing control.

In the present invention, it is preferable that the photographing apparatus further comprises a number of persons input section which receives an input of any desired number of object persons to be photographed, and wherein the photographing control section controls the self-timer circuit to clock a predetermined time of period when the face detecting section detects face areas the number of which is equal to or more than that input to the number of persons input section.

That is, when the number of object to be photographed is settled in advance, the number can be input to start the clocking and the shutter control only when the number of face areas are detected, thereby an image having the number of face areas at proper positions can be obtained and an exclusion of a face area from the image can be prevented.

The photographing control section may control, upon a detection of a plurality of face areas by the face detecting section, to execute an automatic exposure control, an automatic focusing control, and a clocking of a predetermined time of period by the self-timer circuit for each certain face area among the plurality of face areas.

The above configuration allows an individual automatic exposure control and automatic focusing control to be performed for each detected face area, and then a clocking and a shutter control to be achieved, and these operations are fully performed for every face area. This means optimized images for the number of objects can be obtained for each of the objects by the continuous repetition of a self photographing under the individually optimized photographing condition (exposure and focus) for each object of a group portrait.

In the present invention, it is also preferable that the photographing apparatus further comprises a composition specifying section which receives a specification for a composition where each of the face areas of any desired objects is disposed to have a desired size, and wherein the photographing control section controls the self-timer circuit to clock a predetermined time of period when each of the face areas detected by the face detecting section is disposed to have a desired size at each of the specified compositions specified by the composition specifying section.

The above configuration achieves an image having any desired composition in which each face is disposed at a desired position to have a desired size even in self photographing. Therefore, for example, an image of an upper body of each object person may be taken.

In the present invention, it is also preferable that the photographing apparatus further comprises a face covering frame range specifying section which receives a specification for a face covering frame range where all of the face areas of any desired objects should be accommodated, and wherein the photographing control section controls the self-timer circuit to clock a predetermined time of period when all of the face areas detected by the face detecting section are accommodated in a face covering frame range specified by the face covering frame range specifying section.

The above configuration allows a clocking and a shutter operation to be performed only when each of the faces are accommodated in a desired face covering frame range, and prevents a shutter operation from being performed with the photographer and other objects being out of the field angle.

The present invention also provides a photographing method which is used in a photographing apparatus having an image pickup element for receiving a light entered through a photographing lens from an object and continuously converting the light into an image signal, and outputting the image signal; an image data converting section for converting the image signal output from the image pickup element to an image data, and outputting the image data; a record indicating section for inputting a record indication of the image data; a self photographing setting section for setting a self photographing mode; a self-timer circuit for clocking a predetermined time of period in response to a receipt of an input of the record indication at the record indicating section in the state in which the self photographing mode is set by the self photographing setting section; a shutter control section for controlling exposure of the image pickup element in response to completion of the clocking of the predetermined time of period by the self-timer circuit; a recording section for recording the image data of the image signal output from the image pickup element in response to the exposure controlled by the shutter control section; and a display section for displaying at least the image data recorded in the recording section.

The photographing method comprises the steps of: detecting a face area of the object based on an image data output from the image data converting section, in response to a receipt of an input of the record indication at the record indicating section; and making the self-timer circuit to clock a predetermined time of period upon a detection of at least one face area.

According to the present invention, a self photographing is effected upon a detection of a face, which prevents a photographing of a failed image which does not include a face of a person in intending photographing a person. In particular, in generating a self portrait photograph where the photographer himself/herself is the object, even through the photographer is away from the photographing apparatus operation, a clocking and a shutter control are performed to obtain an image having the photographer in a proper position only when the photographer properly enters in its field angle. The proper entrance of an object in a field angle facilitates an automatic exposure control and automatic focusing control.

BRIEF DESCRIPTION OF THE DRAWINGS

FIGS. 6A to 6D are views showing detections of a face area;
FIGS. 10A to 10D are views showing detections of face areas;
FIGS. 14A to 14D are views showing detections of face areas.

DETAILED DESCRIPTION OF THE PREFERRED EMBODIMENTS

Now, preferred embodiment of the present invention will be explained below with reference the drawings.

First Embodiment

Figure 1:
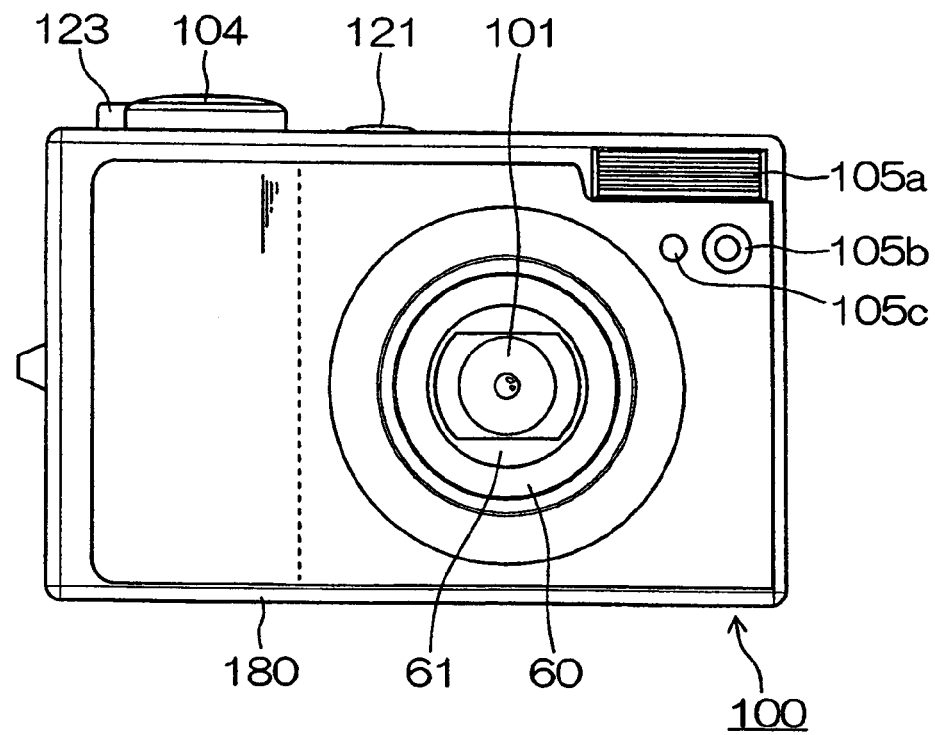
FIG. 1 is a front view showing a digital camera.

FIG. 1 is a front view showing a digital camera (hereinafter, simply referred to as camera) 100 according to a preferred embodiment of the present invention.

The camera 100 has a lens barrel 60 on the front surface thereof, and the lens barrel 60 is provided with a built-in photographing lens 101 including a zoom lens 101a and a focusing lens 101b, so that a movement of the zoom lens 101a in the direction of the optical axis enables a focal length adjustment, and also a movement of the focusing lens 101b in the direction of the optical axis enables a focus adjustment.

The lens barrel 60 advances and retracts between a wide angle end for the shortest focal length and a telephoto end for the longest focal length, both ends being set in advance, so as to be projected out of and housed in a camera body 180. In FIG. 1, the lens barrel 60 is retracted in the camera body 180.

The camera 100 is also provided with a lens cover 61 for protecting the photographing lens 101 by covering the front surface of the photographing lens 101 to shield it from the outside while the camera 100 is not operated for photographing, and for exposing the photographing lens 101 to the outside for image pickup.

The lens cover 61 is configured with an openable and closable mechanism for covering the front surface of the photographing lens 101 at its open position, and exposing the front surface of the photographing lens 101 to the outside at its closed position. The lens cover 61 is interlocked to a power button 121 to be opened/closed. In FIG. 1, the lens cover 61 is opened.

The camera 100 has a mode dial 123 provided with a central release button 104, and a power button 121 on the top surface thereof, and has an electronic flash unit 105a, an AF auxiliary light lamp 105b, a self-timer lamp 105c and the like on the front surface thereof.

Figure 2:
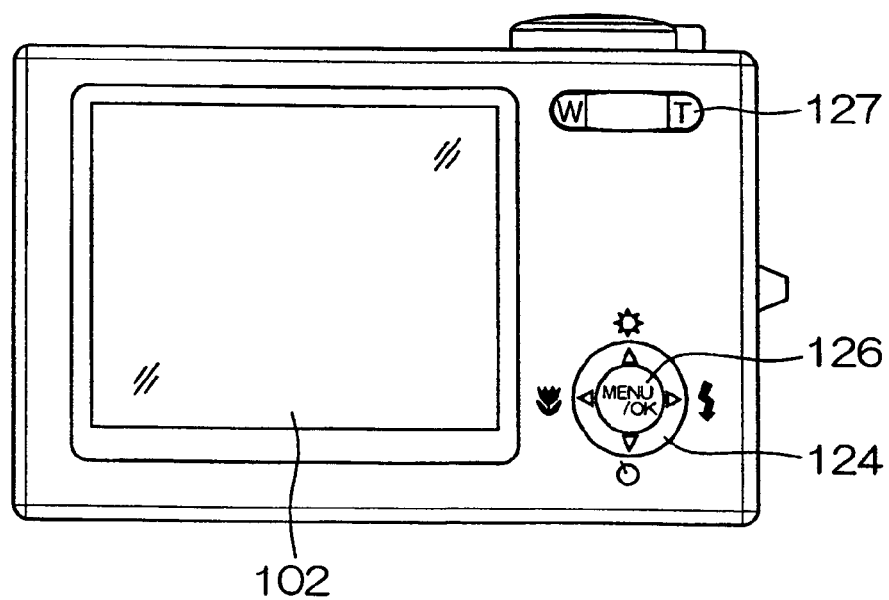
FIG. 2 is a back view showing a digital camera.

FIG. 2 is a back view showing the camera 100. The camera 100 has a zoom switch 127 on the rear surface thereof. A continuous pressing of a telephoto (T) side of the zoom switch 127 causes the lens barrel 60 to be projected toward the telephoto side, and a continuous pressing of the other side (W) of the zoom switch 127 causes the lens barrel 60 to move toward the wide angle side.

The camera 100 also has an image display LCD 102, a crosskey 124, an information position specifying key 126 and the like on the rear surface thereof. The crosskey 124 is an operation system to set a display brightness control, a self-timer, a macro photography, and a flash photography at the top, bottom, left, and right portions thereof respectively. As explained below, a pressing of the bottom key of the crosskey 124 sets a self photographing mode in which a main CPU 20 causes a CCD image sensor 132 to operate a shutter operation after a clocking of the self-timer circuit 83 is completed.

Figure 3:
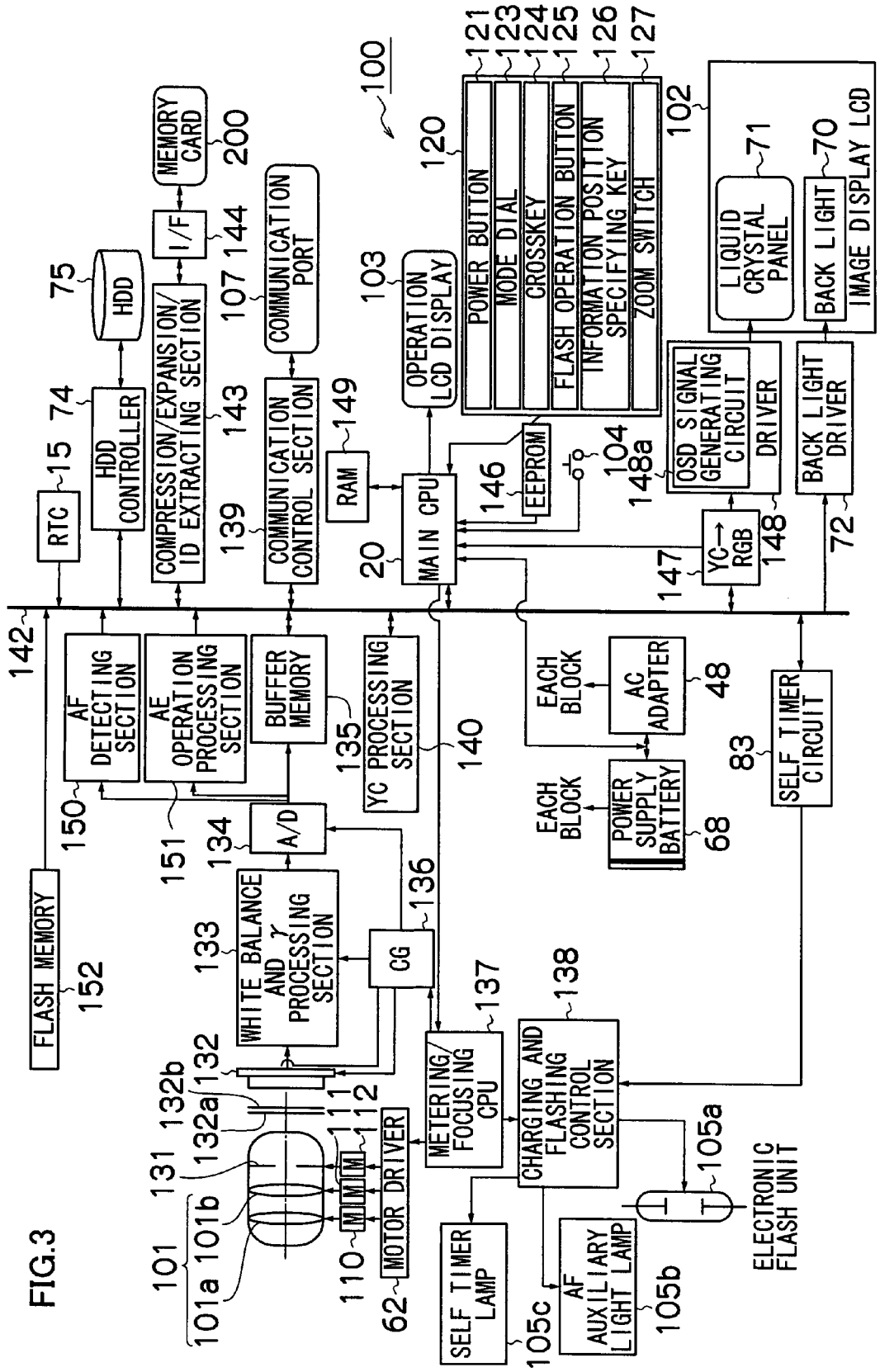
FIG. 3 is a block diagram showing a digital camera.

FIG. 3 is a block diagram of the camera 100 according to the first embodiment. The camera 100 is provided with an operating section 120 for various operations associated with a use of the camera 100 by a user. The operating section 120 includes a power button 121 for supplying power to operate the camera 100, a mode dial 123 for selecting an auto photography, a manual photography or the like, a crosskey 124 for setting or selecting different menu or zooming, a flash operation button 125, and an information position specifying key 126 for implementing or canceling the menu selected by the crosskey 124.

The camera 100 is also provided with an image display LCD 102 for displaying a photographed image, reproduced image or the like, and an operation LCD display 103 for assisting the operations.

The camera 100 includes a release button 104. A pressing of the release button 104 informs a main CPU 20 of a start of photographing. The camera 100 is switchable between a photographing mode and a reproducing mode by using a predetermined menu screen. The camera 100 is also provided with an AF auxiliary light lamp 105b having light emitting diodes (LED) for emitting a spot light to an object in a contrast AF mode, and a flash operation device having an electronic flash unit 105a for flashing light.

The camera 100 is also provided with a photographing lens 101, an aperture 131, and a CCD image sensor 132 (hereinafter, simply referred to as CCD 132) which is an image pickup element for converting the object image which is formed through the photographing lens 101 and the aperture 131 into an analog image signal. The CCD 132 generates an image signal by accumulating the charges generated by the object light incident on the CCD 132 for a variable charge storage time (exposure time). The CCD 132 sequentially outputs an image signal for each frame at a timing synchronized with the vertical synchronizing signal VD which is output from a CG section 136.

When the used image pickup element is the CCD 132, an optical lowpass filter 132a is provided thereto which removes unnecessary high frequency components in an incident light in order to prevent generation of a color error signal, moire fringe or the like. Also, an infrared cut filter 132b is provided for absorbing or reflecting the infrared rays of the incident light to correct the sensitivity characteristics inherent to the CCD sensor 132 which has a high sensitivity to a longer wavelength range. The optical lowpass filter 132a and infrared cut filter 132b may be arranged in any manner without being limited to any particular aspect.

The camera 100 is also provided with a white balance and γ processing section 133 which includes an amplifier where amplification factor is variable, for adjusting the white balance of the object image represented by the analog image signal from the CCD sensor 132, controlling the slope (γ) of the straight line in the gradient characteristics of the object image, and amplifying the analog image signal.

The camera 100 is also provided with an A/D converting section 134 for A/D converting the analog signal from the white balance and γ processing section 133 into digital R, G, and B image data, and a buffer memory 135 for storing the R, G, and B image data from the A/D converting section 134.

The R, G, and B image data obtained by the A/D converting section 134 is also input to an AF detecting section 150. The AF detecting section 150 integrates and averages the R, G, and B image data on the basis of a predetermined divided area in one screen and a color component of the screen, and further calculates the integral average values Ir, Ig, and Ib of the R, G, and B image data for the entire areas for each frame. The integral average values Ir, Ig, and Ib are the received amounts of visible light in R, G, and B, respectively.

However, the received amounts Ir, Ig, and Ib of visible light in R, G, and B can also be detected by an optical sensor (not shown) other than CCD 132 which has sensitivities for each visible light in R, G, B.

The camera 100 is also provided with the CG (clock generator) section 136, a CPU for metering/focusing CPU 137 a charging and flashing control section 138, a communication control section 139, a YC processing section 140, and a power supply battery 68.

The CG section 136 outputs vertical synchronizing signals VD for driving the CCD 132, driving signals including a high speed output pulse P, control signals for controlling the white balance and γ processing section 133 and the A/D converting section 134, and control signals for controlling the communication control section 139. The CG section 136 receives control signals which are input by a metering/focusing CPU 137.

The metering/focusing CPU 137 controls a zoom motor 110, a focus motor 111, and an aperture motor for aperture adjustment 112 to drive the zoom lens 101a, focusing lens 101b, aperture 131 respectively, so that the distance to the object is calculated (focusing), and the CG section 136 and the charging and flashing control section 138 are controlled. The driving of the zoom motor 110, the focus motor 111, and the aperture motor 112 is controlled by a motor driver 62, control command for motor driver 62 is sent from the metering/focusing CPU 137 or the main CPU 20.

The driving source of the zoom lens 101a, the focusing lens 101b, the aperture 131, and the AF auxiliary light lamp 105 is not necessarily limited to various motors such as the zoom motor 110, the focus motor 111, and the aperture motor 112, and may be an actuator for example.

The metering/focusing CPU 137 measures the brightness of the object (calculation of EV value) based on the image data (through image) periodically obtained (every 1/30 seconds to 1/60 seconds) by the CCD 132 when the release button 104 is half pressed (S1 is on).

That is, an AE operation processing section 151 integrates the R, G, and B image signals output from the A/D converting section 134, and provides the resultant integrated value to the metering/focusing CPU 137. The metering/focusing CPU 137 detects an average brightness of the object (object luminance) based on the integrated value input from the AE operation processing section 151, and calculates an exposure value (EV value) which is appropriate to photographing.

Then, the metering/focusing CPU 137 determines an exposure value including an aperture value (F value) of the aperture 131 and an electronic shutter (shutter speed) of the CCD 132 based on the obtained EV value and according to a predetermined program diagram (AE operation).

A full pressing of the release button 104 (S2 is on) causes the metering/focusing CPU 137 to drive the aperture 131 based on the determined aperture value, control the diameter of the aperture 131, and control the charge storage time at the CCD 132 via the CG 136 based on the determined shutter speed.

The AE operation includes aperture priority AE, shutter speed priority AE, program AE, and the like, and either operation is controlled to pickup image with a proper exposure, by measuring an object luminance and photographing with an exposure value, that is, a combination of an aperture value and a shutter speed, which is determined based on the measured value of the object luminance. This achieves an elimination of the troublesome process to determine an exposure.

The AF detecting section 150 extracts an image data, which corresponds to the detecting range selected by the metering/focusing CPU 137, from the A/D converting section 134. A focal position is detected using the characteristics of a high frequency component in the image data which has the maximum amplitude at the focused point. The AF detecting section 150 integrates the high frequency components in the extracted image data for one field so as to calculate an amplitude value. The AF detecting section 150 serially performs the calculation of the amplitude value while the metering/focusing CPU 137 controls the focus motor 111 to drive the zoom lens 101a to move within the movable range, that is between an infinite side (INF point) and a near side end (NEAR point), and sends the detected value to the metering/focusing CPU 137 when the maximum amplitude is detected.

The metering/focusing CPU 137, after obtaining the detected value, issues a command to the focus motor 111 to cause the focusing lens 101b to move to the focused position corresponding to the detected value. The focus motor 111 causes the focusing lens 101b to move to the focused position, in response to the command issued by the metering/focusing CPU 137 (AF operation).

The metering/focusing CPU 137 is connected to the release button 104 by way of the communication with the main CPU 20, and when a user presses the release button 104 halfway, the detection of a focused position is performed. The metering/focusing CPU 137 is connected to the zoom motor 110, so that when the main CPU 20 acquires a command for a zooming in the TELE direction or WIDE direction by the zoom switch 127 from a user, a driving of the zoom motor 110 allows the zoom lens 101a to move between the WIDE end and the TELE end.

The charging and flashing control section 138 charges a flashing capacitor (not shown) for flashing the electronic flash unit 105a when powered by a power battery 68, and controls the flashing of the electronic flash unit 105a.

The charging and flashing control section 138 controls the power supply to the self-timer lamp (tally lamp) 105c and the AF auxiliary light lamp 105b so that a desired light amount can be obtained at a desired timing, in response to the start of the charge of the power battery 68 and the receipt of various signals including the half pressed/fully pressed operation signal of the release button 104 and the signals showing the light amount and flashing timing from the main CPU 20 and the metering/focusing CPU 137.

The self-timer lamp 105c may use LEDs and the LEDs may be common to those used in the AF auxiliary light lamp 105b.

The main CPU 20 is connected to the self-timer circuit 83. When a self photographing mode is set, the main CPU 20 performs a clocking based on a fully pressed signal of the release button 104. During the clocking, the main CPU 20 causes the self-timer lamp 105c to blink with the blinking speed being increased as the remained time decreases, through the metering/focusing CPU 137. The self-timer circuit 83 inputs a clocking completion signal to the main CPU 20 upon the completion of the clocking. Then the main CPU 20 causes the CCD 132 to perform a shutter operation based on the clocking completion signal.

The communication control section 139 is provided with a communication port 107. The communication control section 139 functions to perform a data communication with the external apparatus by outputting an image signal of the object photographed by the camera 100 to the external apparatus such as a personal computer having a USB terminal and allowing such an external apparatus to input an image signal to the camera 100. The camera 100 has a function which is mimic to the switching function of a standard camera for photographing onto a roll of a film to switch between ISO film speeds 80, 100, 200, 400, 1600, and when a film speed of ISO 400 or more is selected, the amplification factor of an amplifier included in the white balance and γ processing section 133 switches to a high sensitivity mode in which the amplification factor is set to be higher than a predetermined amplification factor. The communication control section 139 disconnects the communication with an external apparatus during the photographing in a high sensitivity mode.

The camera 100 is further provided with a compressing/expanding/ID extracting -section 143 and an I/F section 144. The compressing/expanding/ID extracting section 143 reads out an image data stored in the buffer memory 135 through a bus line 142 and compresses the image data, which is stored in the memory card 200 via the I/F section 144. The compressing/expanding/ID extracting section 143 also extracts an identification number (ID) unique to the memory card 200 when it reads out an image data stored in the memory card 200, so that the compressing/expanding/ID extracting section 143 reads out the image data stored in the memory card 200, and expands and stores it in the buffer memory 135.

A Y/C signal stored in the buffer memory 135 is compressed by the compressing/expanding/ID extracting section 143 according to a predetermined format, and then is recorded to a removable medium such as the memory card 200 or built-in high-capacity storage media such as a hard disk (HDD) 75 via the I/F section 144 in a predetermined format (for example, Exif (Exchangeable Image File Format) file). A recording of a data to the hard disk (HDD) 75 or a reading of a data from the hard disk (HDD) 75 is controlled by the hard disk controller 74 in response to a command issued by the main CPU 20.

The camera 100 is also provided with the main CPU 20, an EEPROM 146, a YC/RGB conversion section 147, and a display driver 148. The main CPU 20 provides overall controls of the camera 100. The EEPROM 146 stores individual data and programs unique to the camera 100. The YC/RGB conversion section 147 converts a color video signal YC generated at the YC processing section 140 into a three-color RGB signal, and outputs the converted signal to the image display LCD 102 via the display driver 148.

The camera 100 has an AC adapter 48 and a power battery 68 removably attached thereto for an electric power supply from an AC power source. The power battery 68 may be a rechargeable secondary battery such as a Nickel-Cadmium battery, a nickel hydrogen battery, or a lithium ion battery. Alternatively, the power battery 68 may be a single use primary battery such as a lithium battery or an alkaline battery. The power battery 68 is mounted in a battery housing chamber (not shown) to be electrically connected to each circuit of the camera 100.

When the AC adapter 48 is mounted to the camera 100 for an electric power supply from the AC power source to the camera 100 via the AC adapter 48, even if the power battery 68 is mounted to the battery housing chamber, the electric power output from the AC adapter 48 has the priority to be supplied to each section of the camera 100 as a driving electric power. When the AC adapter 48 is not mounted to the camera 100 and the power battery 68 is mounted to the battery housing chamber, the electric power output from the power battery 68 is supplied to each section of the camera 100 as a driving electric power.

Although not shown, the camera 100 is provided with a backup battery other than the power battery 68 which is mounted to the battery housing chamber. The built-in backup battery may be a dedicated secondary battery which is charged by the power battery 68, for example. The backup battery supplies power to the basic functions of the camera 100 when the power battery 68 is not mounted to the battery housing chamber for its replacement or removal.

That is, a stoppage of power supply from the power battery 68 or the AC adapter 48 causes a switching circuit (not shown) to connect the backup battery to a RTC 15 for a power supply to the circuits. This enables a continuous power supply to the basic functions including the RTC 15 until the end of the useful life of the backup battery 29.

The RTC (Real Time Clock) 15 is a dedicated chip for clocking, and remains in continuous operation with the electric power supply from the backup battery even while a power supply from the power battery 68 or the AC adapter 48 is stopped.

The image display LCD 102 is provided with a back light 70 which illuminates a transmissive or semi-transmissive liquid crystal panel 71 from its rear surface side, and in a power saving mode, the main CPU 20 controls the brightness (luminance) of the back light 70 via a backlight driver 72, so that the power consumption by the back light 70 can be reduced. The power saving mode can be turned on/off when the information position specifying key 126 of the operation section 120 is pressed to cause the image display LCD 102 to display a menu screen and a predetermined operation is executed on the menu screen.

Figure 4:
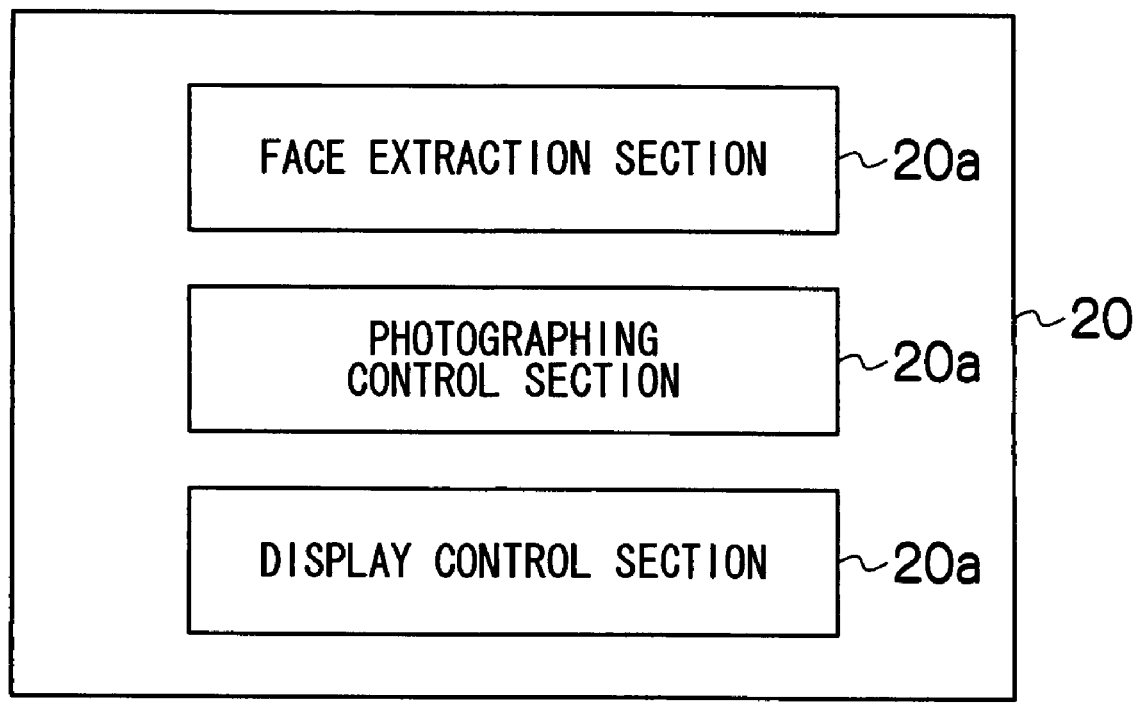
FIG. 4 is a conceptual view showing a program implemented by a main CPU according to a first embodiment.

FIG. 4 is a block diagram conceptually showing a program according to a first embodiment, which is implemented by the main CPU 20. The main CPU 20 reads out the face detecting section 20*a*, the photographing control section 20*b*, and the display control section 20*c* which are the programs stored in a computer readable storage medium such as an EEPROM 146 or a hard disk 75 into the RAM 145 and executes them. These sections may be simply referred to a program.

The face detecting section 20*a* detects a face area including the face part of a person from the through image which is sequentially stored in the buffer memory 135 or an image from memory card 200. The detection of the face area may be performed by using the technology disclosed in Japanese Patent Application Laid-Open No. 9-101579 filed by the assignee of the present invention.

In the technology, it is determined if the color tone of each pixel in the photographed image is within the skin color range or not so that a skin color region and a non skin color region of the image are divided, and an edge in the image is detected so that every point of the image is categorized into an edge part or a non-edge part. Then, a region which locates in the skin color region, is consisted of the pixels categorized as the non-edge part, and is surrounded by the pixels determined to be the edge part is extracted as a face candidate region, and then it is determined if the extracted face candidate region corresponds to the face of the person or not, thereby a region is detected as a face area based on the determined result. Alternatively, a face area may be detected by using the method described in Japanese Patent Application Laid-Open No. 2003-209683 or Japanese Patent Application Laid-Open No. 2002-199221.

The photographing control section 20*b* executes a photographing process which will be explained below.

The display control section 20*c* sends a command to a built-in OSD signal generating circuit 148*a* in the driver 148 to generate a signal to display character and symbol information including shutter speed, aperture value, maximum number of photographs that can be taken, date and time of photographing, warning message, and graphical user interface (GUI). Then, the OSD signal generating circuit 148*a* outputs a signal which is mixed with the image signal from a YC/RGB converting section 147 as needed to be supplied to the liquid crystal panel 71. This allows a combined image which includes a through image or reproduced image on which the characters and the like are superimposed thereto to be displayed.

Figure 5:
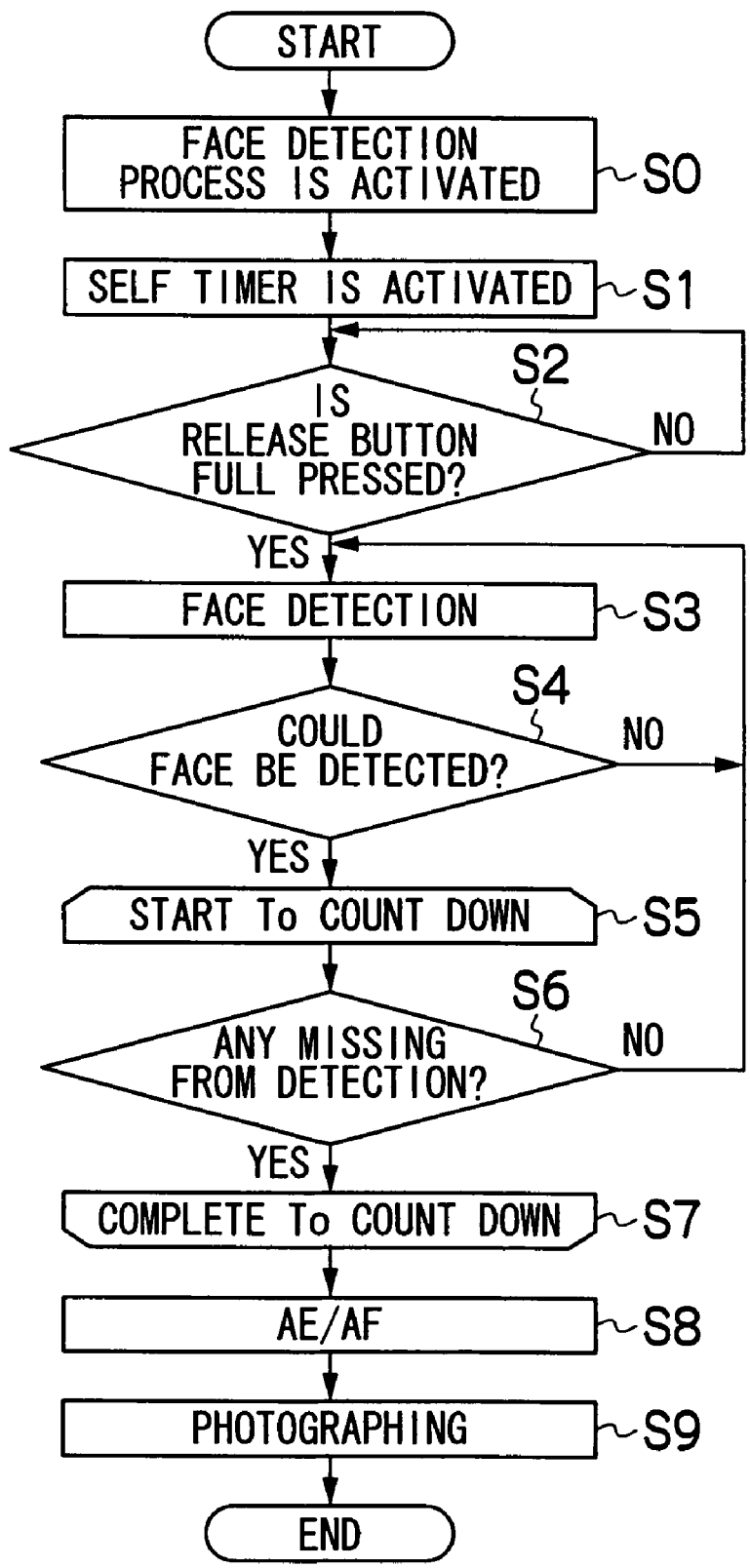
FIG. 5 is a flowchart illustrating the flow of a photographing process according to a first embodiment.

Now, with reference to the flowchart of FIG. 5, the flow of the photographing process executed by the CPU 20 will be explained below.

At S0, while the through image is displayed on the LCD 102 in response to the "Photographing Mode" setting, in accordance with the activation of "Face Search Function" by the operating section 120, the display control section 20*c* controls the OSD signal generating circuit 148*a* to display a video signal of an icon I1 (see FIG. 6A) which shows the Face Search Function setting on the through image. The term "Face Search Function" as used herein is a function to detect a face from a through image by the face detecting section 20*a*.

At S1, the photographing control section 20*b* sets a predetermined clock time $T_0$ (for example, for 10 seconds) to the self-timer circuit 83, in response to the self photographing mode setting by the operating section 120. The display control section 20*c*, in response to the self photographing mode setting, controls the OSD signal generating circuit 148*a* to display a video signal of an icon I2 (see FIG. 6B) which shows the self photographing mode setting on the through image to be combined thereto.

At S2, the photographing control section 20*b* detects a fully pressed signal (or half pressed signal) of the release button 104, and the process goes to S3 in response to the detection.

At S3, the face detecting section 20*a* detects a face area based on the through image. The display control section 20*c* controls the OSD signal generating circuit 148*a* to display a video signal of an icon I3 (see FIG. 6C) which shows that a face detection is being performed on the through image to be combined thereto. Until a face is detected, the icon I1 or I3 may be blinked.

At S4, the face detecting section 20*a* determines if at least one face area is detected from the through image or not. When at least one face area is detected, the process goes to S5. When no face area is detected, the process goes back to S3 to continue the face detection. However, if no face area is still detected after face detection for a predetermined time (for example, 10 seconds), the photographing process may be ended. When at least one face area is detected, supply of the video signal of the icon I1 or I3 may be stopped.

At S5, the self-timer circuit 83 clocks a predetermined waiting time $T_0$. During the clocking, the self-timer circuit 83 causes a self-timer lamp 105*c* to blink in a blinking pattern in which the blinking speed is increased as the remained amount of the predetermined waiting time decreases, via the metering/focusing CPU 137. The blinking pattern informs the object that the clocking is started upon the detection of the object's face, so that the object can prepare for the shutter operation after the clocking.

At S6, during the clocking of the predetermined waiting time $T_0$ by the self-timer circuit 83, the face detecting section 20*a* monitors if no face area is detected from the through image at all. When the face detecting section 20*a* determines that no face area is detected from the through image, the self-timer circuit 83 stops the clocking of the waiting time, and the process goes back to S3 to resume the face detection. This avoids a recording of a failed image in which the object's face is out of the field angle, during the waiting time.

At S7, the self-timer circuit 83 determines if the clocking of the predetermined waiting time $T_0$ is completed or not, and repeats S5 to S7 until the clocking is completed. Upon the completion of the clocking, the self-timer circuit 83 outputs a clocking completion signal to the main CPU 20, and the process goes to S8.

At S8, the main CPU 20 performs an AF/AE/AWB (Auto White Balance) adjusting operation and the like for the face area detected by the face detecting section 20*a*, and locks the focal position and the exposure value which are obtained by the operation. The display control section 20*c* may control the OSD signal generating circuit 148*a* to display a video signal of an icon I4 (see FIG. 6D) which shows that the focal position of the face area detected by the face detecting section 20*a* is locked on the through image to be combined thereto.

At S9, after the completion of the AF and AE operation, the main CPU 20 immediately causes the CCD 132 to perform the shutter operation so as to acquire an image for recording. The acquired image data is stored in a memory card 200 (or HDD 75). When the image acquisition is completed, the self-timer lamp 105*c* may be set to blink in a unique pattern which is different from that for clocking to inform a success of the photographing. Alternatively, a sounding chime may be used to inform a success of a photographing.

The process at S8 may be performed during the processes at S5 to S7. However, as shown in FIG. 5, it is preferred to perform the AF and AE operation after the completion of the clocking of a predetermined waiting time $T_0$, that is, just before a photographing. During the photographing process, if the power button 121 is pressed or the process is cancelled by using the information position specifying key 126, the photographing process may be stopped.

According to the above described processes, during a photographing using a self-timer, the clocking of predetermined waiting time $T_0$ is started only when a face of a person is detected. Therefore, even when a photographer himself/herself is an object, a self photographing can be achieved without fail with the face being in the field angle. Even when the face goes out of the field angle during the clocking, the clocking will be resumed after the detection of the face, resulting in that the photographer who is the object does not have to worry that the self photographing might be performed without knowing whether his/her face is in the field angle or not.

Second Embodiment

Figure 7:
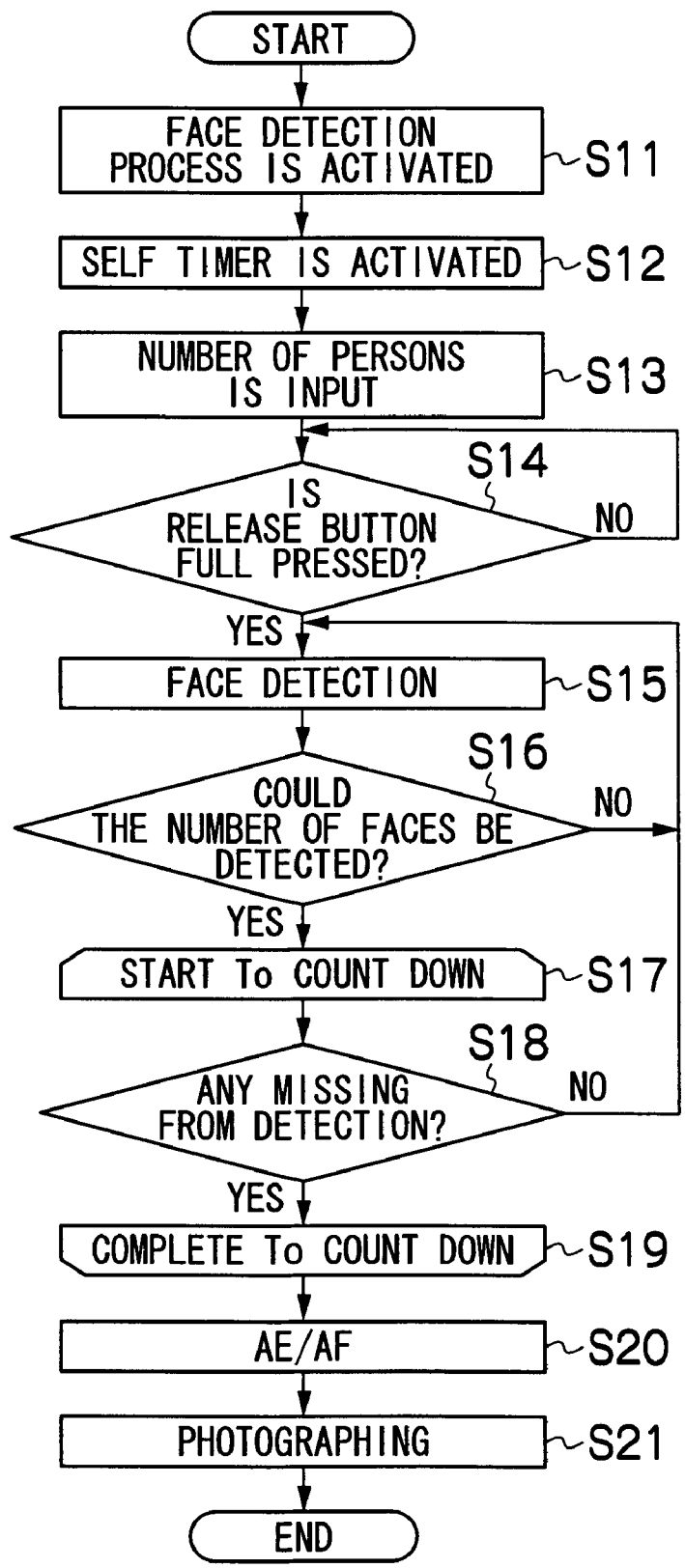
FIG. 7 is a flowchart illustrating the flow of a photographing process according to a second embodiment.

FIG. 7 is a flowchart illustrating the flow of a photographing process according to a preferred second embodiment of the present invention.

At S11, in accordance with the activation of "Face Search Function" by the operating section 120, an icon I1 is displayed.

Figure 8A:
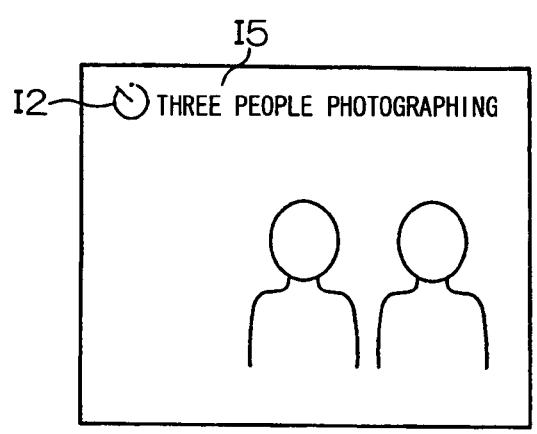
FIGS. 8A and 8B are views showing detections of face areas.

At S12, the photographing control section 20*b*, in response to the self photographing mode setting, sets a predetermined clock time $T_0$ (for example, for 10 seconds) to the self-timer circuit 83. The display control section 20*c*, in response to the self photographing mode setting, controls the OSD signal generating circuit 148*a* to display a video signal of an icon I2 (see FIG. 8A) which shows the self photographing mode setting on the through image to be combined thereto.

At S13, the photographing control section 20*b* receives an input of the number of objects to be photographed from the operating section 120. The display control section 20*c* controls the OSD signal generating circuit 148*a* to display a video signal of an icon I5 (see FIG. 8A) which shows the input number of persons on the through image to be combined thereto.

At S14, the photographing control section 20*b* detects a fully pressed signal (or half pressed signal) of the release button 104, and the process goes to S15 in response to the detection.

At S15, the face detecting section 20*a* detects the face areas of the input number of persons based on the through image.

At S16, the face detecting section 20*a* determines if the face areas of the input number of persons are detected from the through image or not. When the face areas of the number of persons are detected, the process goes to S17. When the face areas of the number of persons are not detected at all, the process goes back to S15 to continue the face detection. However, if the face areas of the number of persons are not still detected after detection for a predetermined time (for example, 10 seconds), the detection process may be ended.

At S17, the self-timer circuit 83 clocks a predetermined waiting time $T_0$. During the clocking, the self-timer circuit 83 causes a self-timer lamp 105*c* to blink in a blinking pattern in which the blinking speed is increased as the remained amount of the predetermined waiting time decreases, via the metering/focusing CPU 137.

At S18, during the clocking of the predetermined waiting time $T_0$ by the self-timer circuit 83, the face detecting section 20*a* monitors whether no face area is detected from the through image. When the face detecting section 20*a* determines that no face area of the number of persons is detected from the through image, the self-timer circuit 83 stops the clocking of the waiting time, and the process goes back to S15 to resume the face detection.

At S19, the self-timer circuit 83 determines if the clocking of the predetermined waiting time $T_0$ is completed or not, and repeats S17 to S19 until the clocking is completed. Upon the completion of the clocking, the self-timer circuit 83 outputs a clocking completion signal to the main CPU 20, and the process goes to S20.

Figure 8B:
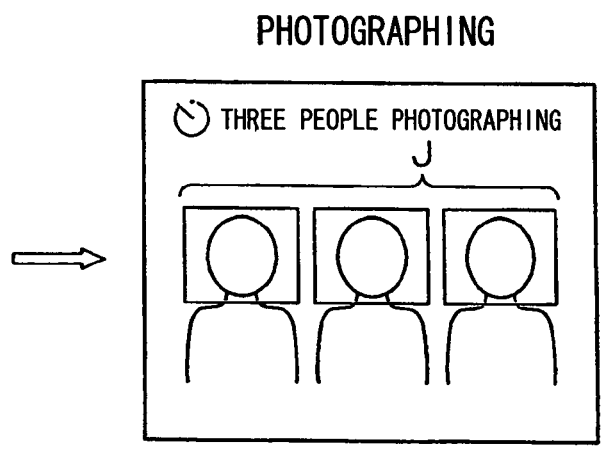

At S20, the main CPU 20 performs an AF and AE operation on a face area which has the highest priority among the face areas detected by the main CPU 20 (for example, the face area having the largest surface area, the face area detected with the utmost accuracy, or the face area arranged at a position which is optionally specified for a face area having the highest priority by the operating section 120, such as the center of the field angle), and locks the focal position and the exposure value obtained by the operation. The display control section 20*c* may control the OSD signal generating circuit 148*a* to display a video signal of an icon J (see FIG. 8B) which shows the face area detected by the face detecting section 20*a* on the through image to be combined thereto.

At S21, upon the completion of the AF and AE operation, the main CPU 20 causes the CCD 132 to perform a shutter operation so as to acquire an image for recording. The acquired image data is stored in the memory card 200 (or HDD 75).

According to the above described processes, during photographing using a self-timer, the clocking of predetermined waiting time To is started only when the optionally specified number of faces are detected. Therefore, a self photographing can be achieved without fail with the number of faces being in the field angle, and particularly when a photographer is the object, an exclusion of the photographer out of the field angle can be prevented. Even when the face goes out of the field angle during the clocking, the clocking will be resumed after the detection of the face, therefore, the photographer does not have to set self timer mode again and again.

Third Embodiment

Figure 9:
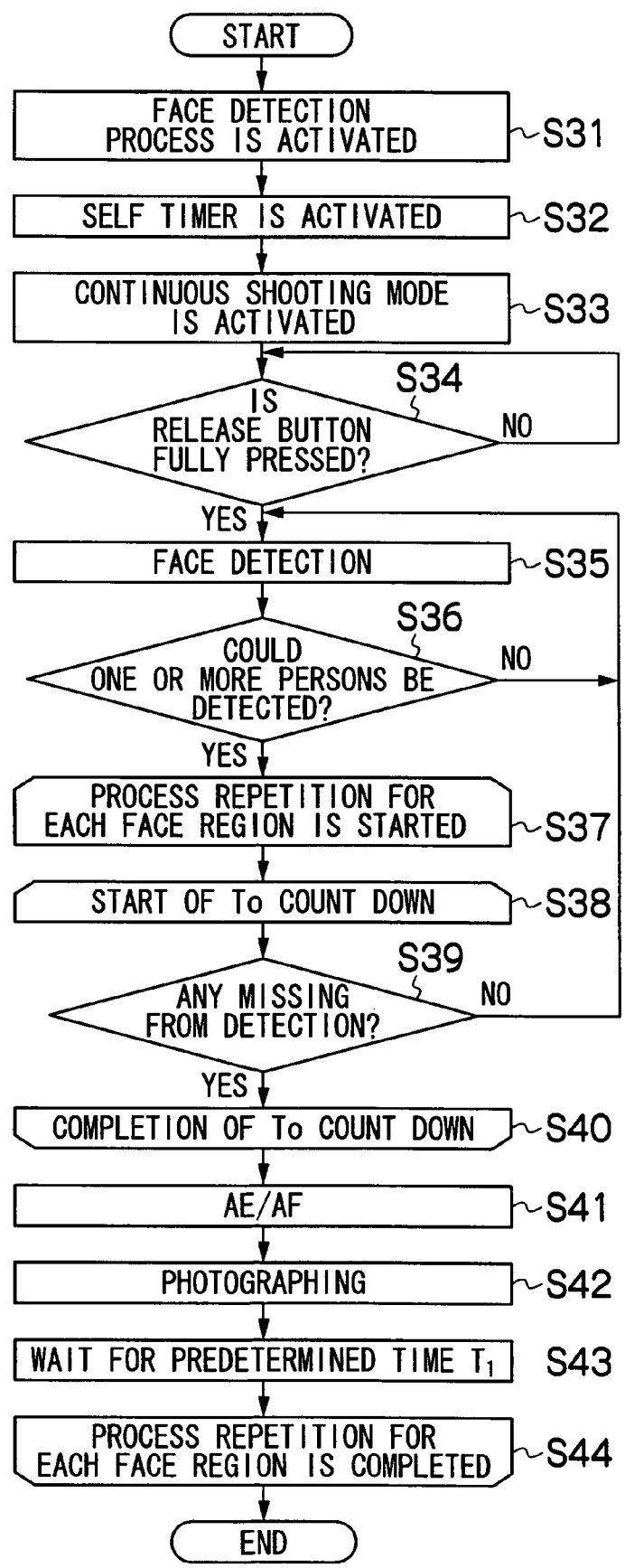
FIG. 9 is a flowchart illustrating the flow of a photographing process according to a third embodiment.

FIG. 9 is a flowchart illustrating the flow of a photographing process according to a preferred third embodiment of the present invention.

At S31, in accordance with the activation of "Face Search Function" by the operating section 120, the icon I1 is displayed.

At S32, the photographing control section 20b, in response to the self photographing mode setting, sets a predetermined clock time $T_0$ (for example, for 10 seconds) to the self-timer circuit 83. The display control section 20c, in response to the self photographing mode setting, controls the OSD signal generating circuit 148a to display a video signal of an icon I2 (see FIG. 10A) which shows the self photographing mode setting on the through image to be combined thereto.

At S33, the display control section 20c, in accordance with the activation of "Face Continuous Shooting Function" by the operating section 120, controls the OSD signal generating circuit 148a to display a video signal of an icon 16 (see FIG. 10A) which shows the face continuous shooting function setting on the through image to be combined thereto.

At S34, the photographing control section 20b detects a fully pressed signal (or half pressed signal) of the release button 104, and the process goes to S35 in response to the detection.

At S35, face detecting section 20a detects the face areas of the input number of persons based on the through image.

At S36, the face detecting section 20a determines if the face areas are detected from the through image or not. When the face areas are detected, the process goes to S37. When the face areas are not detected, the process goes back to S35 to continue the face detection. However, if the face areas are not still detected after detection for a predetermined time (for example, for 10 seconds), the detection process may be ended.

S37 to S44 are a unit process which is repeated for the detected face area, and S39 to S43 are repeated for all the detected face areas.

At S38, the self-timer circuit 83 clocks a predetermined waiting time $T_0$. During the clocking, the self-timer circuit 83 causes a self-timer lamp 105c to blink in a blinking pattern (clock blinking pattern) in which the blinking speed is increased as the remained amount of the predetermined waiting time decreases, via the metering/focusing CPU 137.

At S39, during the clocking of the predetermined waiting time To by the self-timer circuit 83, the face detecting section 20a monitors if no face area of the number of persons is detected from the through image. When the face detecting section 20a determines that no face area is detected from the through image, the self-timer circuit 83 stops the clocking of the waiting time, and the process goes back to S35 to resume the face detection.

At S40, the self-timer circuit 83 determines if the clocking of the predetermined waiting time $T_0$ is completed or not, and repeats S39 until the clocking is completed. Upon the completion of the clocking, the self-timer circuit 83 outputs a clocking completion signal to the main CPU 20, and the process goes to S41.

At S41, the main CPU 20 performs an AF and AE operation on a certain face area defined in the predetermined order, among the face areas detected by the face detecting section 20a, (for example, the face area which is specified from the left side to the right side of the field angle one by one), and locks the focal position and the exposure value obtained by the operation. The display control section 20c controls the OSD signal generating circuit 148a to change the attributes (line width, color, dashed line pitch, and the like) of a video signal of the icon which shows a certain face area the focus of which is locked among the icons I7-1, I7-2, I7-3 . . . (see FIGS. 10B to 10D) showing the face areas detected by the face detecting section 20a.

In FIGS. 10B to 10D, the attributes of the icons I7-1, I7-2, and I7-3 are changed respectively.

At S42, upon the completion of the AF and AE operation, the main CPU 20 causes the CCD 132 to perform a shutter operation so as to acquire an image for recording. The acquired image data is stored in the memory card 200 (or HDD 75).

At S43, the process waits for a predetermined waiting time $T_1$ (for example, for 5 seconds), and goes to S44 after the waiting time $T_1$ has passed.

At S44, it is determined if the unit process from S38 to S42 is performed on every face area or not, and if not yet, the process goes back to S38 to repeat the processes from S38 to S42 for the next face area. If the unit process has been performed already for every face area, the photographing process ends.

According to the above described processes, a photographing is repeated under an optimized condition for each of the plurality of objects in the field angle, which enables a continuous photographing of images under an optimized condition for each of the objects for the number of objects whose faces are detected without troubling a photographer.

Fourth Embodiment

Figure 11:
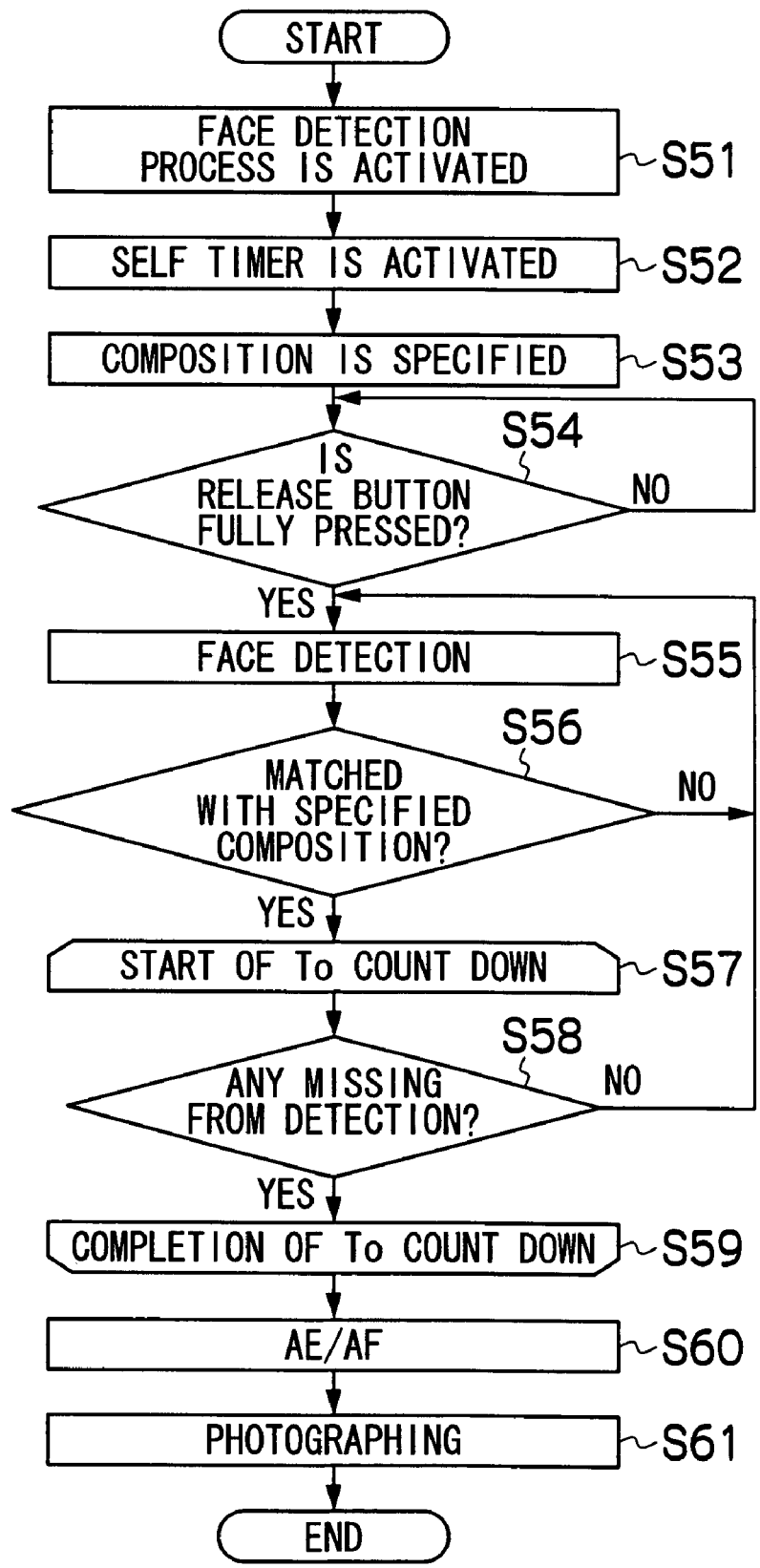
FIG. 11 is a flowchart illustrating the flow of a photographing process according to a fourth embodiment.

FIG. 11 is a flowchart illustrating the flow of a photographing process according to a preferred fourth embodiment of the present invention.

At S51, an icon I1 is displayed in accordance with the activation of "Face Search Function" by the operating section 120.

At S52, the photographing control section 20b, in response to the self photographing mode setting, sets a predetermined clock time $T_0$ (for example, 10 seconds) to the self-timer circuit 83. The display control section 20c, in response to the self photographing mode setting, controls the OSD signal generating circuit 148a to display a video signal of an icon I2 (see FIG. 12A) which shows the self photographing mode setting on the through image to be combined thereto.

At S53, the photographing control section 20b receives a specification of the desired composition of one or more objects to be photographed (i.e. a size and a position for the face area of each object) from the operating section 120. The display control section 20c controls the OSD signal generating circuit 148a to display video signals of icons I8-1, I8-2 . . . (see FIG. 12A) which shows the specified desired composition on the through image to be combined thereto.

At S54, the photographing control section 20b detects a fully pressed signal (or half pressed signal) of the release button 104, and the process goes to S55 in response to the detection.

At S55, the face detecting section 20a detects a face area based on the through image. The display control section 20c may control the OSD signal generating circuit 148a to change the attributes such as color, line width, and dashed line pitch of the icons I8-1, I8-2 . . . (see FIG. 12A) so as to show that a face detection is being performed.

At S56, the face detecting section 20a determines if the size and position of each of the face areas detected from the through image fits with each of the specified compositions or not. When each face area fits with each composition, the process goes to S57. When one of the face areas does not fit with the composition, or if the same number of face areas as those of the compositions cannot be detected, the process goes back to S55 to continue the face detection. However, if a face area is still not detected after detection for a predetermined time (for example, for 10 seconds) or if the face areas does not fit with the compositions, the detection process may be ended.

The display control section 20c may control the OSD signal generating circuit 148a to change the attributes such as color, line width, and dashed line pitch of the icons I8-1, I8-2 ... (see FIG. 12A) so as to show that a detected face area fits or does not fit with a corresponding composition.

Figure 12B:
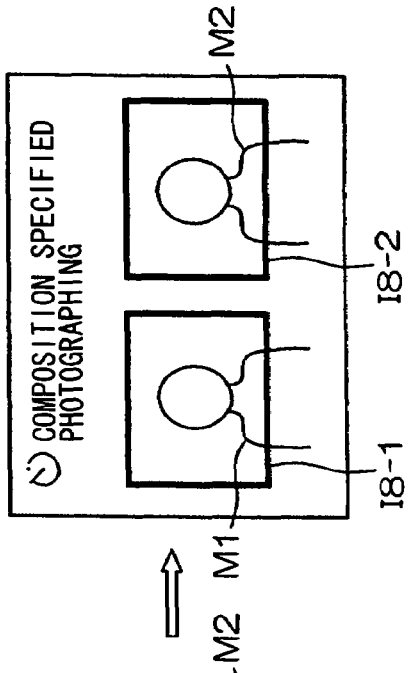
FIGS. 12A to 12D are views showing detections of face areas.
Figure 12D:
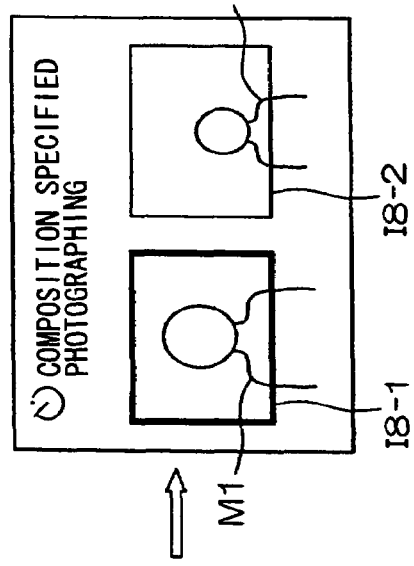
Figure 12A:
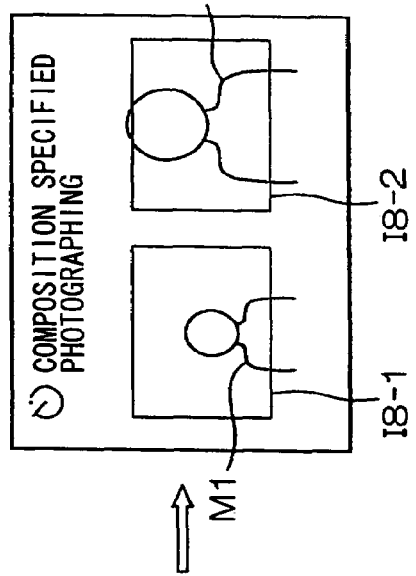
Figure 12C:
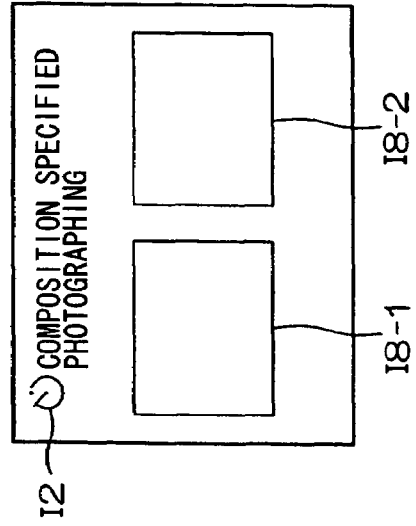

For example, it is assumed that a composition having an upper body of an object therein as shown in FIG. 12A is specified. The icons I8-1, I8-2 ... show the following states by the changed line widths respectively: in FIG. 12B, none of the face areas of an object M1 on the left side and an object M2 on the right side fit with the composition; in FIG. 12C, the face area of an object M1 on the left side fits with the composition (i.e. the upper body of the object M1 is positioned in the frame) and the face area of an object M2 on the right side does not fit with the composition; and in FIG. 12D, both of the face areas of an object M1 on the left side and an object M2 on the right side fit with the composition (i.e. the upper bodies of the object M1 on the left side and the object M2 on the right side are positioned in the frame).

At S57, the self-timer circuit 83 clocks a predetermined waiting time $T_0$. During the clocking, the self-timer circuit 83 causes a self-timer lamp 105c to blink in a blinking pattern (clock blinking pattern) in which the blinking speed is increased as the remained amount of the predetermined waiting time decreases, via the metering/focusing CPU 137.

At S58, during the clocking of the predetermined waiting time $T_0$ by the self-timer circuit 83, the face detecting section 20a monitors if there is any face area detected from the through image which does not fit with the composition. When it is determined that there is a face area which does not fit with the composition, the self-timer circuit 83 stops the clocking of the waiting time, and the process goes back to S55 to resume the face detection.

At S59, the self-timer circuit 83 determines if the clocking of the predetermined waiting time $T_0$ is completed or not, and repeats the processes at S57 to S59 until the clocking is completed. Upon the completion of the clocking, the self-timer circuit 83 outputs a clocking completion signal to the main CPU 20, and the process goes to S60.

At S60, the main CPU 20 performs an AF and AE operation on the face area detected by the face detecting section 20a, and locks the focal position and the exposure value obtained by the operation. The display control section 20c controls the OSD signal generating circuit 148a to display video signals of an icon which shows the face area detected by the face detecting section 20a and an icon 16 (see FIG. 8B) which shows a certain face area the focus of which is locked on the through image to be combined thereto.

At S61, upon the completion of the AF and AE operation, the main CPU 20 causes the CCD 132 to perform a shutter operation so as to acquire an image for recording. The acquired image data is stored in the memory card 200 (or HDD 75).

According to the above described processes, during photographing using a self-timer, a clocking of the predetermined waiting time $T_0$ is started only when the detected face is fitted with the optionally specified composition. Therefore, a self photographing can be achieved without fail with the face of an object to be photographed being fitted in an optionally specified composition.

Fifth Embodiment

Figure 13:
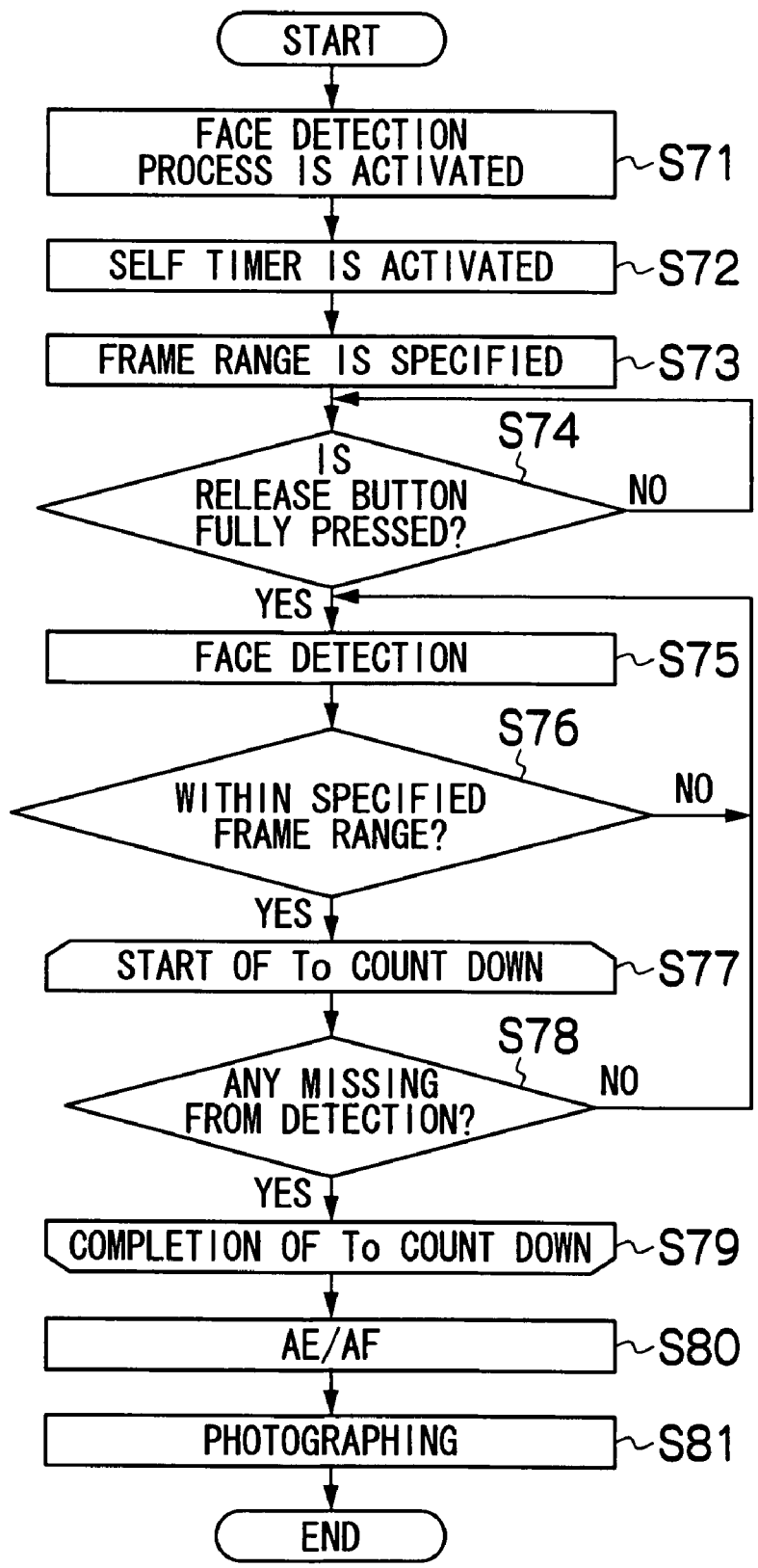
FIG. 13 is a flowchart illustrating the flow of a photographing process according to the fifth embodiment.

FIG. 13 is a flowchart illustrating the flow of a photographing process according to a preferred fifth embodiment of the present invention.

At S71, an icon I1 is displayed in accordance with the activation of "Face Search Function" by the operating section 120.

At S72, the photographing control section 20b, in response to the self photographing mode setting, sets a predetermined clock time $T_0$ (for example, 10 seconds) to the self-timer circuit 83. The display control section 20c, in response to the self photographing mode setting, controls the OSD signal generating circuit 148a to display a video signal of an icon I2 (see FIG. 14A) which shows the self photographing mode setting on the through image to be combined thereto.

At S73, the photographing control section 20b receives a specification of a frame range into which one or more objects to be photographed are accommodated from the operating section 120. The display control section 20c controls the OSD signal generating circuit 148a to display a video signal of an icon I9 (see FIG. 14B) which shows the specified desired frame range on the through image to be combined thereto.

At S74, the photographing control section 20b detects a fully pressed signal (or half pressed signal) of the release button 104, and the process goes to S75 in response to the detection.

At S75, the face detecting section 20a detects a face area based on the through image. The display control section 20c may control the OSD signal generating circuit 148a to change the attributes such as color, line width, and dashed line pitch of the icon I9 so as to show that face detection is being performed.

At S76, the face detecting section 20a determines if the face areas detected from the through image are accommodated in the specified frame range or not. When every face area is accommodated in the specified frame range, the process goes to S77. When at least one of the face areas is not accommodated in the specified frame range, or if no face area is detected, the process goes back to S74 to continue the face detection. However, if any of face areas is not accommodated in the specified frame range or if a face is still not detected after detection for a predetermined time (for example, for 10 seconds), the detection process may be ended.

The display control section 20c may control the OSD signal generating circuit 148a to change the attributes such as color, line width, and dashed line pitch of the icon I9 so as to show that a detected face area is or is not accommodated in a specified frame range.

For example, the icon I9 shows the following states by the changed line widths respectively: in FIG. 14B, the face areas of three objects M1 to M3 who stand in front of the camera 100 are accommodated in the specified frame range, but the face area of a photographer M0 who is going to be a new object is not accommodated in the specified frame range; in FIG. 14C, the face areas of the object M0 on the left side and the object M3 on the right side are not accommodated in the specified frame range; and in FIG. 14D, all of the face areas of the objects M1 to M4 are accommodated in the specified frame range.

At S77, the self-timer circuit 83 clocks a predetermined waiting time $T_0$. During the clocking, the self-timer circuit 83 causes a self-timer lamp 105c to blink in a blinking pattern (clock blinking pattern) in which the blinking speed is increased as the remained amount of the predetermined waiting time decreases, via the metering/focusing CPU 137.

At S78, during the clocking of predetermined waiting time $T_0$ by the self-timer circuit 83, the face detecting section 20a monitors if there is any face area detected from the through image which goes out of the specified frame range. When it is determined that there is a face area which goes out of the specified frame range, the self-timer circuit 83 stops the clocking of the waiting time, and the process goes back to S75 to resume the face detection.

At S79, the self-timer circuit 83 determines if the clocking of the predetermined waiting time $T_0$ is completed or not, and upon the completion of the clocking, the self-timer circuit 83 outputs a clocking completion signal to the main CPU 20, and the process goes to S80.

At S80, main CPU 20 performs an AF and AB operation on the face area detected by the face detecting section 20a, and locks the focal position and the exposure value obtained by the operation.

At S81, upon the completion of the AF and AE operation, the main CPU 20 causes the CCD 132 to perform a shutter operation so as to acquire an image for recording. The acquired image data is stored in the memory card 200 (or HDD 75).

According to the above described processes, during photographing using a self-timer, the clocking of the predetermined waiting time $T_0$ is started only when all of the faces detected are accommodated in the optionally specified frame range. Therefore, a self photographing can be achieved without fail with the faces of objects desired to be photographed being accommodated in the optionally specified frame range, and an exclusion of a part of the objects out of the frame range can be prevented particularly when a photographer is the object.

What is claimed is:

1. A photographing apparatus, comprising:
    an image pickup element for receiving a light entered through a photographing lens from an object and continuously converting the light into an image signal, and outputting the image signal;
    an image data converting section for converting the image signal output from the image pickup element to an image data, and outputting the image data;
    a record indicating section for inputting a record indication of the image data;
    a self photographing setting section for setting a self photographing mode;
    a self-timer circuit for clocking a predetermined time of period in response to a receipt of an input of the record indication at the record indicating section in the state in which the self photographing mode is set by the self photographing setting section;
    a shutter control section for controlling exposure of the image pickup element in response to completion of the clocking of the predetermined time of period by the self-timer circuit;
    a recording section for recording the image data of the image signal output from the image pickup element in response to the exposure controlled by the shutter control section;
    a display section for displaying at least the image data recorded in the recording section;
    a face detecting section for detecting a face area of an object based on the image data output from the image data converting section, in response to a receipt of an input of the record indication at the record indicating section; and
    a photographing control section for controlling the self-timer circuit to clock the predetermined time of period when the face detecting section detects at least one face area.

2. The photographing apparatus according to claim 1, further comprising a number of persons input section which receives an input of any desired number of object persons to be photographed,
    wherein the photographing control section controls the self-timer circuit to clock a predetermined time of period when the face detecting section detects face areas the number of which is equal to or more than that input to the number of persons input section.

3. The photographing apparatus according to claim 1, wherein
    the photographing control section controls, upon a detection of a plurality of face areas by the face detecting section, to execute an automatic exposure control, an automatic focusing control, and a clocking of a predetermined time of period by the self-timer circuit for each certain face area among the plurality of face areas.

4. The photographing apparatus according to claim 2, wherein
    the photographing control section controls, upon a detection of a plurality of face areas by the face detecting section, to execute an automatic exposure control, an automatic focusing control, and a clocking of a predetermined time of period by the self-timer circuit for each certain face area among the plurality of face areas.

5. The photographing apparatus according to claim 1, further comprising a composition specifying section which receives a specification for a composition where each of the face areas of any desired objects is disposed to have a desired size,
    wherein when each of the face areas detected by the face detecting section is disposed to have a desired size at each of the specified compositions specified by the composition specifying section, the photographing control section controls the self-timer circuit to clock a predetermined time of period.

6. The photographing apparatus according to claim 2, further comprising a composition specifying section which receives a specification for a composition where each of the face areas of any desired objects is disposed to have a desired size,
    wherein when each of the face areas detected by the face detecting section is disposed to have a desired size at each of the specified compositions specified by the composition specifying section, the photographing control section controls the self-timer circuit to clock a predetermined time of period.

7. The photographing apparatus according to claim 3, further comprising a composition specifying section which receives a specification for a composition where each of the face areas of any desired objects is disposed to have a desired size,
    wherein when each of the face areas detected by the face detecting section is disposed to have a desired size at each of the specified compositions specified by the composition specifying section, the photographing control section controls the self-timer circuit to clock a predetermined time of period.

8. The photographing apparatus according to claim 4, further comprising a composition specifying section which receives a specification for a composition where each of the face areas of any desired objects is disposed to have a desired size, wherein when each of the face areas detected by the face detecting section is disposed to have a desired size at each of the specified compositions specified by the composition specifying section, the photographing control section controls the self-timer circuit to clock a predetermined time of period.

9. The photographing apparatus according to claim 1, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

10. The photographing apparatus according to claim 2, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

11. The photographing apparatus according to claim 3, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

12. The photographing apparatus according to claim 4, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

13. The photographing apparatus according to claim 5, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

14. The photographing apparatus according to claim 6, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

15. The photographing apparatus according to claim 7, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

16. The photographing apparatus according to claim 8, further comprising a face covering frame range specifying section which receives a specification for a face covering frame range where all of the face areas of any desired objects should be accommodated, wherein the photographing control section control the self-timer circuit to clock a predetermined time of period when all of the face areas detected by the face detecting section are accommodated in the face covering frame range specified by the face covering frame range specifying section.

17. A photographing method which is used in a photographing apparatus having an image pickup element for receiving a light entered through a photographing lens from an object and continuously converting the light into an image signal, and outputting the image signal; an image data converting section for converting the image signal output from the image pickup element to an image data, and outputting the data; a record indicating section for inputting a record indication of the image data; a self photographing setting section for setting a self photographing mode; a self-timer circuit for clocking a predetermined time of period in response to a receipt of an input of the record indication at the record indicating section in the state in which the self photographing mode is set by the self photography setting section; a shutter control section for controlling exposure of the image pickup element in response to completion of the clocking of the predetermined time of period by the self-timer circuit; a recording section for recording the image data of the image signal output from the image pickup element in response to the exposure controlled by the shutter control section; and a display section for displaying at least the image data recorded in the recording section, the method comprising the steps of:

detecting a face area of the object based on an image data output from the image data converting section, in response to a receipt of an input of the record indication at the record indicating section; and making the self-timer circuit to clock a predetermined time of period upon a detection of at least one face area.

* * * * *